(12) United States Patent
Heinz et al.

(10) Patent No.: US 6,547,213 B1
(45) Date of Patent: *Apr. 15, 2003

(54) VALVE FOR CONTROLLING LIQUIDS

(75) Inventors: Rudolf Heinz, Renningen (DE); Wolfgang Stoecklein, Stuttgart (DE); Klaus-Peter Schmoll, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

This patent is subject to a terminal disclaimer.

(21) Appl. No.: 09/856,600

(22) PCT Filed: Sep. 19, 2000

(86) PCT No.: PCT/DE00/03241
§ 371 (c)(1), (2), (4) Date: May 23, 2001

(87) PCT Pub. No.: WO01/23747
PCT Pub. Date: Apr. 5, 2001

(30) Foreign Application Priority Data

Sep. 30, 1999 (DE) .......................................... 199 46 830

(51) Int. Cl.$^7$ ............................................... F16K 31/12
(52) U.S. Cl. .................. 251/57; 251/129.06; 239/102.1
(58) Field of Search .............................. 251/57, 129.06, 251/335.2, 335.3; 137/627.5, 901; 239/102.1, 102.2, 585.1

(56) References Cited

U.S. PATENT DOCUMENTS

| | | | |
|---|---|---|---|
| 4,560,871 A | * 12/1985 | Bowman et al. | ............... 251/57 |
| 4,762,300 A | 8/1988 | Inagaki | |
| 5,036,821 A | 8/1991 | Horiuchi | |
| 6,076,800 A | * 6/2000 | Heinz et al. | ................... 251/57 |
| 6,142,443 A | * 11/2000 | Potschin et al. | ....... 251/129.06 |

FOREIGN PATENT DOCUMENTS

| | | |
|---|---|---|
| DE | 43 08 297 A | 9/1993 |
| DE | 198 07 903 A | 9/1999 |
| EP | 0 477 400 A1 | 4/1992 |

* cited by examiner

Primary Examiner—Gene Mancene
Assistant Examiner—John Bastianelli
(74) Attorney, Agent, or Firm—Michael J. Striker

(57) ABSTRACT

A valve for controlling fluids is described, wherein a valve closing member (13) divides a low-pressure region (16) in the valve (1) from a high-pressure region (17), and a filling device (19) is provided to compensate for a leakage quantity from the low-pressure region (16) by withdrawal of hydraulic fluid from the high-pressure region (17). The filling device (19) is embodied in a valve body (9) with a conduit-like hollow chamber (18) in which a solid body (26) is disposed in such a way that a gap (28) is formed between the solid body (26) and the valve body (9). The material of the solid body (26) has a coefficient of thermal expansion that is so much greater than that of the material of the valve body (9) that with increasing temperature, a viscosity-dictated increase in the volumetric flow around the solid body (26) is at least partly limited (FIG. 1).

16 Claims, 2 Drawing Sheets

VALVE FOR CONTROLLING LIQUIDS

PRIOR ART

Figure 1:
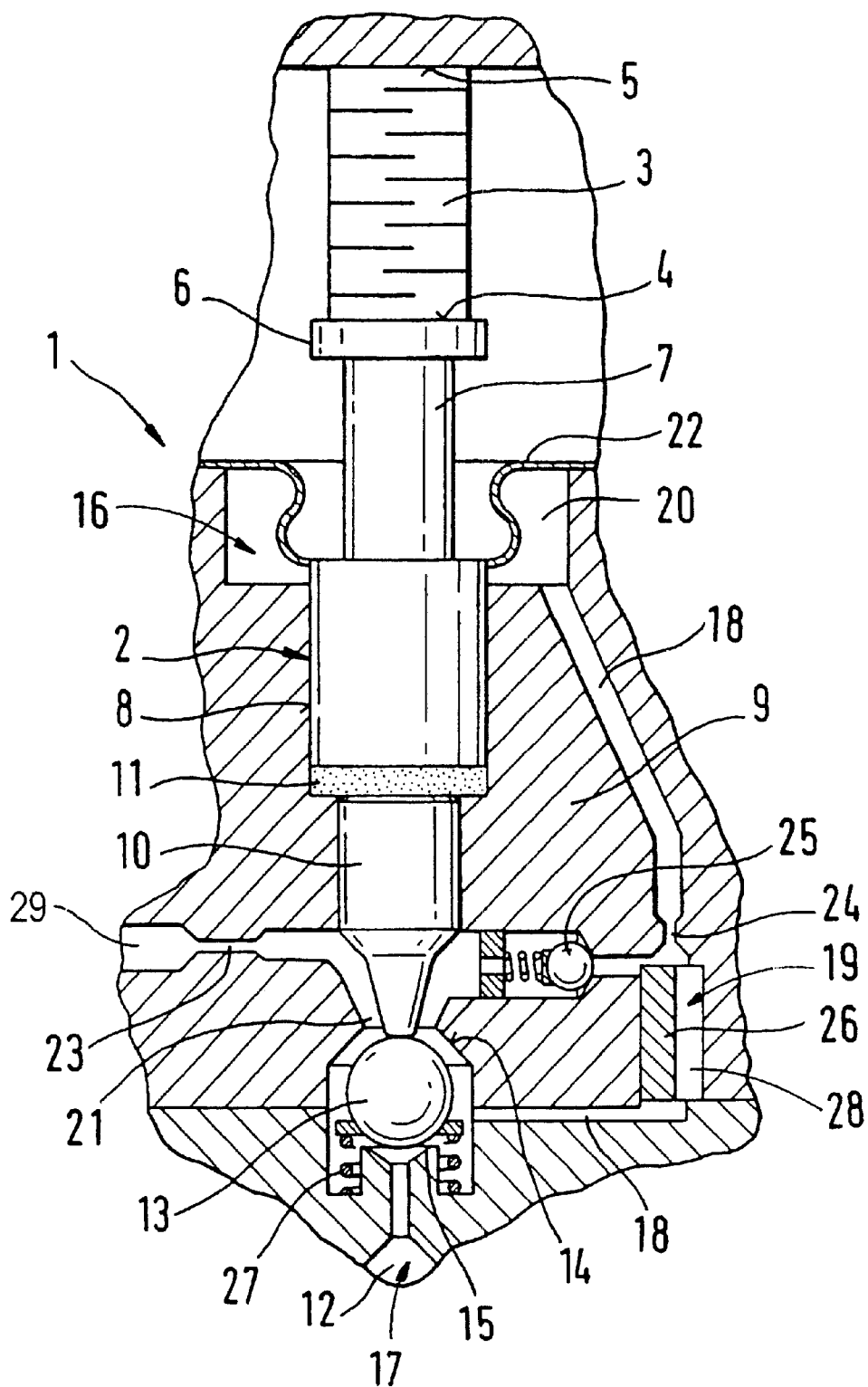

The invention is based on a valve for controlling fluids of the type defined in greater detail in the preamble to claim 1.

In the industry, valves for controlling fluids are well known in which a valve closing member divides a low-pressure region in the valve from a high-pressure region, for instance in pumps or fuel injectors in motor vehicles.

European Patent Disclosure EP 0 477 400 A1 also describes such a valve, which is actuatable via a piezoelectric actuator and has an arrangement for a travel converter, acting in the direction of reciprocation, of the piezoelectric actuator; in this arrangement, the deflection of the actuator is transmitted via a hydraulic chamber, which functions as a hydraulic step-up means or coupling and tolerance compensating element. The hydraulic chamber encloses a common compensation volume between two pistons defining this chamber, of which one piston is embodied with a smaller diameter and is connected to a valve member to be triggered, and the other piston is embodied with a larger diameter and is connected to the piezoelectric actuator. The hydraulic chamber is fastened between the two pistons in such a way that the actuating piston executes a stroke that is increased by the step-up ratio of the piston diameter when the larger piston is moved a certain travel distance by the piezoelectric actuator. The valve member, piston and piezoelectric actuator are located on a common axis. Via the compensation volume of the hydraulic chamber, tolerances caused by temperature gradients in the component or different coefficients of thermal expansion of the materials used and possible settling effects can be compensated for without causing a change in position of the valve member to be triggered.

In the low-pressure region, in particular the hydraulic coupler, the hydraulic system requires a system pressure, which drops because of leakage if adequate refilling with hydraulic fluid is not done.

To that end, in the industry, for common rail injectors, versions are known in which the system pressure, which is expediently generated in the valve itself and which should be as constant as possible even upon system starting, is assured by delivery of hydraulic fluid from the high-pressure region of the fuel to be controlled into the low-pressure region having the system pressure. This is done with the aid of leakage gaps, which are defined by leakage or filling pins.

However, the dimensioning of the leakage gap is a problem; this gap must be adjusted such that the system pressure in the entire operating region can be built up and maintained on the low-pressure side of the valve. Upon temperature fluctuations of the fluid flowing through the leakage gap, the flow volume varies in accordance with the change in viscosity of the fluid. In common rail injectors, for instance, the leakage gap is chosen to be relatively large, so that the system pressure in the low-pressure region can be maintained even at extremely low temperatures, at which the viscosity of diesel fuel increases up to the point of gelling of the diesel fuel. As a result, at typical operating temperatures or high temperatures, a great amount of fluid passes through the gap around the leakage pin to reach the low-pressure region, and the excess amount of fluid must be bled off via a pressure holding valve. Thus an undesirably great leakage loss of the valve exists, and because of this the efficiency of the entire system drops sharply.

The object of the invention is to create a valve for controlling fluids in which a leakage quantity from a high-pressure region into a low-pressure region of the valve is at least approximately constant in the event of temperature changes.

ADVANTAGES OF THE INVENTION

The valve for controlling fluids of the invention having the characteristics of claim 1 has the advantage that the gap between the solid body and the valve body can be designed as relatively large, so that an adequate volumetric throughput is assured even at very low temperatures of the flowing fluid. At rising temperature and decreasing viscosity of the fluid flowing through the gap, the solid body expands more, because of its higher coefficient of thermal expansion, than does the material of the valve body, so that with increasing temperature the gap decreases in size, and thus advantageously the entire volumetric throughput is adjusted at medium and high temperatures in the same way as in the low temperature range.

Since with the valve of the invention an increase in the leakage rate in the low-pressure region as a consequence of rising temperatures is prevented, the necessity of bleeding off large amounts of excess pumped fluid through an overpressure valve is also dispensed with, and the efficiency of the entire system is therefore unimpaired.

Further advantages and advantageous features of the subject of the invention can be learned from the specification, drawing and claims.

DRAWING

Two exemplary embodiments of the valve of the invention for controlling fluids are shown in the drawing and described in further detail in the ensuing description. Shown are FIG. 1, a schematic, fragmentary view of a first exemplary embodiment of the invention in a fuel injection valve for internal combustion engines, in longitudinal section; and FIG. 2, a schematic view of a second, fragmentary exemplary embodiment, in a fuel injection valve in longitudinal section.

DESCRIPTION OF THE EXEMPLARY EMBODIMENTS

The exemplary embodiment shown in FIG. 1 illustrates a use of the valve of the invention in a fuel injection valve 1 for internal combustion engines of motor vehicles. The fuel injection valve 1 is embodied here as a common rail injector, and the fuel injection is controlled via the pressure level in a valve control chamber 12, which is connected to a high-pressure supply.

The injection onset, injection duration, and injection quantity are adjusted in the fuel injection valve 1 via fuel ratios; a valve member 2 is triggered via an actuator system, embodied as a piezoelectric unit with a piezoelectric actuator 3, that is disposed on the side of the valve member 2 remote from the valve control chamber and the combustion chamber. The piezoelectric actuator 3 is made up in the usual way of multiple layers, and on its side toward the valve member 2 it has an actuator head 4 and on its side remote from the valve member it has an actuator foot 5, which is braced on a wall of a valve body 9. Via a bearing 6, a first piston 7, embodied with a stepped diameter, of the valve member 2 rests on the actuator head 4.

The valve member 2 is disposed axially displaceably in a bore 8, embodied as a longitudinal bore, of the valve body 9 and along with the first piston 7 also has a second piston 10 that actuates a valve closing member 13. The pistons 7 and 10 of the valve member 2 are coupled to one another by a hydraulic step-up means, which is embodied as a hydraulic chamber 11.

Between the two pistons 7 and 10 defining it, of which the second piston 10 is embodied with a smaller diameter and the first piston 7 is embodied with a larger diameter, the hydraulic chamber 11 encloses a common compensation volume, by way of which the deflection of the piezoelectric actuator 3 is transmitted. To that end, the hydraulic chamber 11 is fastened between the pistons 7 and 10 in such a way that the second piston 10 of the valve member 2 executes a stroke that is lengthened by the step-up ratio of the piston diameter when the larger first piston 7 is moved a certain travel distance by the piezoelectric actuator 3. The valve member 2, the pistons 7 and 10, and the piezoelectric actuator 3 are located one after the other on a common axis.

Along with the hydraulic step-up, via the compensation volume of the hydraulic chamber 11, tolerances from temperature gradients or different coefficients of thermal expansion of the materials used and possible settling effects can also be compensated for, without causing any change in the position of the valve closing member 13 to be triggered.

On the end of the valve member 2 toward the valve control chamber, the spherical valve closing member 13 cooperates with valve seats 14, 15 embodied on the valve body 9; the valve closing member 13 divides a low-pressure region 16 at a system pressure from a high-pressure region 17 at a high pressure or rail pressure.

The end of the bore 8 toward the piezoelectric actuator is adjoined by a first valve pressure chamber 20, which is bounded on one side by the valve body 9 and then the other by a sealing element 22 which is connected to the first piston 7 of the valve member 2 and to the valve body 9. The sealing element 22 here is embodied as a bellowslike diaphragm and prevents the piezoelectric actuator 3 from coming into contact with the fuel contained in the first valve pressure chamber 20.

Via a conduitlike hollow chamber 18 of a filling device 19, the first valve pressure chamber 20 communicates with a second valve pressure chamber 21, which leads to the valve control chamber 12 of the high-pressure region 17 and in which the valve seats 14, 15 are embodied. From this second valve pressure chamber 21, which depending on the position of the valve closing member 13 can be made to communicate with the high-pressure region 17, a leak drainage conduit 29 leads away, and in the leak drainage conduit 29, a throttle 23 is disposed as a damping device for the adjusting motion of the valve closing member 13.

Also provided in the second valve pressure chamber 21 is a spring 27, assigned to the lower valve seat 15, that upon relief of the valve control chamber 12 keeps the valve closing member 13 on the upper valve seat 14.

A movable valve control piston, which is not further shown in the drawing, is disposed in the valve control chamber 12 that is merely suggested in FIG. 1. By axial motions of the valve control piston in the valve control chamber 12, an injection nozzle of the fuel injection valve 1 is controlled in a manner known per se. An injection line which supplies the injection nozzle with diesel fuel typically discharges into the valve control chamber 12 as well. The injection line communicates with a high-pressure storage chamber (common rail) that is common to a plurality of fuel injection valves.

The conduitlike hollow chamber 18 in the filling device 19 has a spring-loaded overpressure valve 25 on the side toward the low-pressure valve chamber; the overpressure valve regulates the system pressure in the first valve pressure chamber 20 and is equipped with a damping device embodied as a throttle 24.

On the high-pressure side of the overpressure valve 25, a solid body 26 embodied as a cylindrical pin is disposed in the conduitlike hollow chamber 18, and this solid body, together with the valve body 9 surrounding it, defines a gap 28. The cylindrical pin 26 is made from a material whose coefficient of thermal expansion is markedly above that of the surrounding valve body 9, which is typically of steel. Materials which essentially comprise aluminum or copper are especially well suited for the cylindrical pin 26. With this kind of choice of material, a viscosity-dictated increase in the volumetric flow around the cylindrical pin 26 of the filling device 19 as the temperature rises is sharply limited, and with an optimal choice of material, a virtually constant volumetric flow when temperature changes occur is attainable.

To achieve a better surface quality and to protect the cylindrical piston 26 against wear, its surface is coated, and a protective layer of electrically oxidized aluminum is especially advantageous.

The fuel injection valve 1 of FIG. 1 functions as described below.

In the closed state of the fuel injection valve 1, that is, when there is no current to the piezoelectric actuator 3, the valve closing member 13 is kept in contact with its assigned upper valve seat 14, so that no fuel from the high-pressure region 17 can reach the second valve pressure chamber 21 and escape through the leak drainage conduit 29.

In the case of a slow actuation, as occurs in a temperature-dictated change in length of the piezoelectric actuator 3 or other valve components, the first piston 7, acting as an adjusting piston, penetrates the compensation volume of the hydraulic chamber 11 upon an increase in temperature and is retracted from it again upon a temperature drop, without this having any overall effect on the closing and opening position of the valve member 2 and of the fuel valve 1.

For an injection through the fuel injection valve 1, the piezoelectric actuator 3 is supplied with electric current, causing its sudden axial expansion. In this kind of fast actuation of the piezoelectric actuator 3, the piezoelectric actuator is braced on the valve. body 9 and moves the second piston 10 together with the valve closing member 13 from its upper valve seat 14 into a middle position between the two valve seats 14 and 15. By the adjusting motion of the valve member 2, the volume of the first valve pressure chamber 20 is reduced by means of the diaphragm 22, and as a result the system pressure in the first valve pressure chamber 20 rises accordingly. This pressure increase cannot be reversed immediately. by the overpressure valve 25, since the throttle 24 briefly impounds the system pressure. As a result, a hydraulic counterforce acts on the diaphragm 22, counter to the adjusting motion of the valve member 2. The adjusting motion is thus damped, and the valve closing member 13 is stabilized in its middle position.

Once the system pressure has been reduced by the overpressure valve 25, the closing member 13 can be moved into its closing position against the lower valve seat 15, and as a result no further fuel from the valve control chamber 12 can enter the second valve pressure chamber 21. This terminates the fuel injection.

When the current supply to the piezoelectric actuator 3 is subsequently interrupted, the valve member returns to its middle position, and a fuel injection takes place. Through the lower valve seat 15, fuel can enter the second valve pressure chamber 21, and once again the throttle 23 in the leak drainage conduit 29 causes damping of the adjusting motion of the valve member 2.

To compensate for the quantity of fuel removed through the overpressure valve 25 and the leak drainage conduit 29, a quantity of fuel that as much as possible is equivalent to the leakage loss is carried, in the raised position of the valve closing member 13 from its lower valve seat 15, from the high-pressure region 17 to the low-pressure region 16 via the conduitlike hollow chamber 18 with the gap 28. In the high-pressure region, a rail pressure of 200 to 1800 bar can prevail, while the system pressure in the low-pressure region can for instance amount to 30 bar, and the fuel returned to a tank via the leak drainage conduit 22 can have a low pressure, for instance of 1 bar.

With the design of the solid body or cylindrical piston 28 designed according to the invention with a high thermal expansion capacity, the gap 28 can be made so large that even at extremely low temperatures at which the diesel fuel tends to gel, it is assured that the system pressure will be furnished in the low-pressure region 16. As the temperatures increase, the gap 28 becomes smaller because of the expansion of the cylindrical piston 26; the decrease in size of the gap 28 goes counter to the change in viscosity of the fuel, and the quantity of leaking oil in the low-pressure region 16 in the medium and upper temperature range is thus reduced to the extent that at most a very slight quantity of excess fuel has to be bled out in the low-pressure region 16 via the overpressure valve 25.

Figure 2:
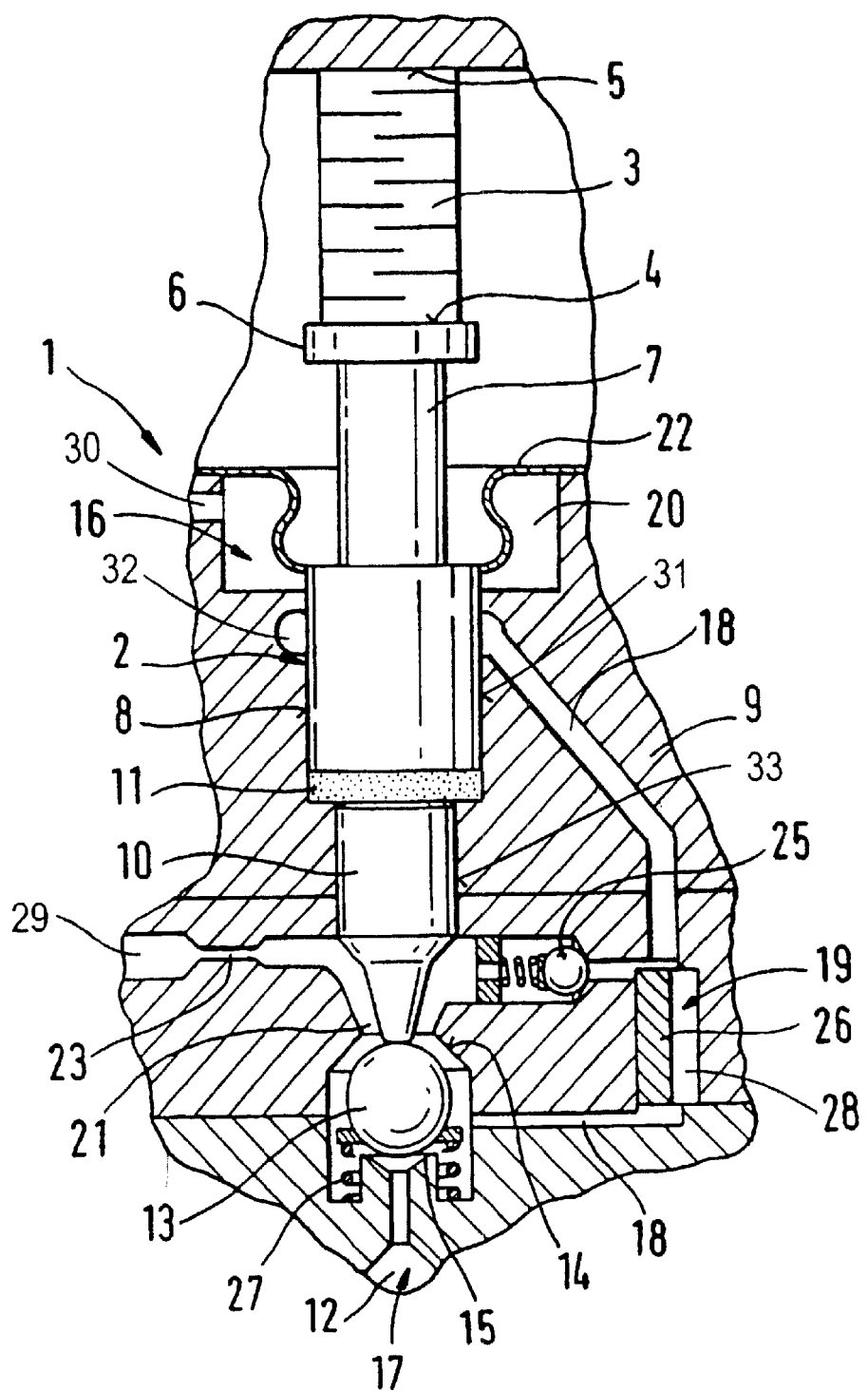

A second exemplary embodiment of the fuel injection valve is shown in FIG. 2 and in principle functions like the fuel injection valve described in conjunction with FIG. 1. For the sake of simplicity, functionally identical components are identified by the same reference numerals as in FIG. 1.

Compared to the version of FIG. 1, the fuel injection valve 1 shown here differs in that the conduitlike hollow chamber 18, instead of discharging into the first valve pressure chamber 20, which here has a leakage line 30 leading to a tank, now discharges on the side of the filling device 19 toward the low-pressure region 16, into a gap 31 surrounding the first piston 7; in the discharge region, an annular groove 32 is provided.

This version has the advantage that only an extremely slight volume is positively displaced out of the system pressure region, so that the continuous leakage of the system is reduced to a minimum in the valve of the invention, yet a continuous flow through the hydraulic chamber 11 and thus rinsing out of any air that has entered it are assured. In addition, the refilling of the hydraulic chamber 11 can advantageously be done at high pressure, so that the fastest possible refilling in the event of a possible leakage loss is attained through the gap 31 or through a gap 32 surrounding the second piston 10. In this way, the time interval between fuel injections can be kept very short, and as a result high engine speeds can be achieved. Compared to the version of FIG. 1, in the variant embodiment of FIG. 2, in which the part of the conduitlike hollow chamber 18 on the low-pressure side and the annular groove 32 are embodied as a system pressure chamber, impacts from pressure on the sealing element 21, which in this embodiment is again a diaphragm, are avoided, which is especially advantageous when impact-vulnerable sealing materials are employed.

It is understood that an alternative version can also be provided in which the conduitlike hollow chamber 18 leads from the solid body or cylindrical pin 28 of the filling device 19 to the gap 32 surrounding the second piston 10.

By the embodiment according to the invention of the solid body 26 with a high capacity for thermal expansion and the dimensioning of the gap 28, it is assured here as well that the system pressure is assuredly furnished even at a minimum high pressure and at very low fuel temperatures. If the fuel temperature rises, for instance because of an increased return quantity at high load and a corresponding high dissipation of thermal energy from the high-pressure pump to the fuel, the gap 28 decreases in size by expansion of the cylindrical pin 26 in such a way that the viscosity-dictated increase in the volumetric flow around the cylindrical pin 26 is at least partly limited.

It is understood that the invention can be used not only in the common rail injectors described here as a preferred field of use, but can also be realized in general in fuel injection valves or in other associated fields, such as in pumps.

What is claimed is:

1. A valve for controlling fluids, wherein a valve closing member (13) divides a low-pressure region (16) in the valve (1) from a high-pressure region (17), and a filling device (19) is provided to compensate for a leakage quantity from the low-pressure region (16) by withdrawal of hydraulic fluid from the high-pressure region (17), wherein the filling device (19) is embodied in a valve body (9) with a conduit-like hollow chamber (18) in which a solid body (26) is disposed in such a way that a gap (28) is formed between the solid body (26) and the valve body (9), and wherein the material of the solid body (26) has a coefficient of thermal expansion that is so much greater than that of the material of the valve body (9) that with increasing temperature, a viscosity-dictated increase in the volumetric flow around the solid body (26) is at least partly limited.

2. The valve of claim 1, characterized in that the solid body (26) is embodied as a cylindrical pin.

3. The valve of claim 1, characterized in that the solid body (26) is surface-coated, in particular with a protective layer of electrically oxidized aluminum.

4. The valve of claim 1, characterized in that the solid body (26) substantially comprises aluminum or copper.

5. The valve of claim 1, characterized in that the gap (28) between the solid body (26) and the valve body (9) is designed such that the volumetric flow past the solid body (26) from the high-pressure region (17), at a defined minimum high pressure, compensates for the leakage quantity from the low-pressure region (16).

6. The valve of claim 1, characterized in that the conduit-like hollow chamber (18) discharges into a system pressure chamber (20, 32) of the low-pressure region (16) that is subjected to system pressure in order to control a valve member (2) with which the valve closing member (13) can be actuated.

7. The valve of claim 6, characterized in that the valve member (2), for actuation of the valve closing member (13), is displaceable by an actuator system (3) in a bore (8) of the valve body (9), the valve member (2) being embodied in divided form with at least one first piston (7) and one second piston (10) that are separated from one another by a hydraulic chamber (11), and of which the first piston (7) borders on the actuator system (3) and is surrounded, in a region adjoining the bore (8) of the valve body (9), by a first valve pressure chamber (20), and the second piston (10) borders on a second valve pressure chamber (21), which has at least one seat (14, 15), provided on the valve body (9), for the valve closing member (13) for opening and closing the valve (1).

8. The valve of claim 6, characterized in that the conduit-like hollow chamber (18) of the filling device (19)

discharges, on the side of the solid body (26) toward the low-pressure region (16), into the first valve pressure chamber (20), and the first valve pressure chamber (20) represents the system pressure chamber.

9. The valve of claim 6, characterized in that the conduitlike hollow chamber (18) of the filling device (19) discharges, on the side of the solid body (26) toward the low-pressure region (16), into a gap (31, 33) surrounding the first piston (7) or the second piston (10), and the discharge region represents the system pressure chamber (32).

10. The valve of claim 6, characterized in that the conduitlike hollow chamber (18) of the filling device (19), on the side of the solid body (26) toward the high-pressure region (17), discharges into the second valve pressure chamber (21).

11. The valve of claim 6, characterized in that the valve closing member (13) cooperates in such a way with two valve seats (14, 15), disposed in the second valve pressure chamber (21), to open and close the valve (1) that in a closing position it separates the second valve pressure chamber (21) from a valve control chamber (12) that is at high pressure, and in an intermediate position between the valve seats (14, 15), it fluidically connects the second valve pressure chamber (21) with the valve control chamber (12).

12. The valve of claim 6, characterized in that an overpressure valve (25) is provided to adjust the system pressure between the region of the conduitlike hollow chamber (18), toward the low-pressure region (16), and the valve pressure chamber (21).

13. The valve of claim 6, characterized in that the hydraulic chamber (11) is embodied with system pressure as a tolerance compensating element to compensate for elongation tolerances of the actuator system, embodied as a piezoelectric unit (3), and/or of further valve components (9) and is embodied as a hydraulic step-up means.

14. The valve of claim 6, characterized in that the first valve pressure chamber (20) is defined by a sealing element (22).

15. The valve of claim 14, characterized in that the sealing element defining the first valve pressure chamber (20) is embodied as a bellowslike diaphragm (22), which is connected to the valve member (2) and to the valve body (9) in such a way that the piezoelectric unit (3) is protected against contact with the fluid to be controlled.

16. The valve of claim 1, characterized by its use as a component of a fuel injection valve for internal combustion engines, in particular of a common rail injector (1).

* * * * *